US 6,622,806 B1

(12) United States Patent
Matsuura

(10) Patent No.: US 6,622,806 B1
(45) Date of Patent: Sep. 23, 2003

(54) AIR INLET FOR ATV

(75) Inventor: Tatsuya Matsuura, Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 09/553,652

(22) Filed: Apr. 21, 2000

(30) Foreign Application Priority Data

Apr. 27, 1999 (JP) .......................................... 11-120567
Apr. 27, 1999 (JP) .......................................... 11-120668

(51) Int. Cl.⁷ .......................... B60K 11/08; B60K 11/04
(52) U.S. Cl. ...................... 180/68.1; 180/68.4; 180/908; 123/198 E
(58) Field of Search ................................ 180/68.1, 68.2, 180/68.3, 68.4, 68.6, 69.2, 233, 69.24, 908; 123/198 E

(56) References Cited

U.S. PATENT DOCUMENTS

| 438,644 A | 10/1890 | Robertson |
| 3,650,344 A | 3/1972 | Plessinger et al. |
| 4,354,570 A | 10/1982 | Tanaka et al. |

(List continued on next page.)

FOREIGN PATENT DOCUMENTS

| DE | 171825 | 12/1951 | |
| FR | 2 782 480 A1 * | 8/1998 | ................ 180/68.1 |
| GB | 164051 | 6/1921 | |
| JP | 59-77924 | 5/1984 | |
| JP | 61-89187 | 5/1986 | |
| JP | 5-57955 | 8/1993 | |

OTHER PUBLICATIONS

Parts Catalogue, Model Year 1999, YFZ350L.
Parts Catalogue, Model Year 1999, YFS200L.
Parts Catalogue, Model Year 1999, YFM80L.
Parts Catalogue, Model Year 1999, YFM600FWAL, YFM600FWALC.
Parts Catalogue, Model Year 1999, YFM400FWL, YFM400FWLC.
Parts Catalogue, Model Year 1999, YFM350XL, YFM350XLC.
Parts Catalogue, Model Year 1999, YFM350UL, YFM350ULC.

(List continued on next page.)

Primary Examiner—Brian L. Johnson
Assistant Examiner—Jeff Restifo
(74) Attorney, Agent, or Firm—Knobbe, Martens, Olson & Bear, LLP

(57) ABSTRACT

An all terrain vehicle has a frame assembly. A pair of front wheels and a pair of rear wheels support the frame assembly. A front fender assembly extends over at least a portion of the front wheels. An engine is disposed between the front wheels and the rear wheels. The engine is water-cooled using a radiator and fan combination that is positioned forward of the engine. A belt drive forms a portion of a transmission that transfers power from the engine to at least the rear wheels. The belt drive is air cooled with air that is pulled into the belt drive by fans positioned within a belt case. The air is drawn from an air chamber formed within the front fender assembly. The chamber is positioned vertically higher than the radiator and fan combination and rearward thereof. The air passes between the chamber and the belt case through a duct. The duct extends downward and incorporates a central trap portion. The duct is positioned to lie at least partially within an area that overlaps the fan from a front elevation view. The duct also bends across a central longitudinal plane from inlet to outlet to allow a compact configuration while positioning the duct in protected regions.

45 Claims, 5 Drawing Sheets

U.S. PATENT DOCUMENTS

| | | | |
|---|---|---|---|
| 4,454,926 A | * 6/1984 | Akins | 123/198 E |
| 4,496,019 A | 1/1985 | Tanaka | |
| 4,497,285 A | 2/1985 | Kondo | |
| 4,531,928 A | 7/1985 | Ikenoya | |
| 4,597,466 A | 7/1986 | Yamada | |
| 4,606,422 A | * 8/1986 | Jewett | 180/68.1 |
| 4,697,665 A | 10/1987 | Eastman et al. | |
| 4,744,432 A | 5/1988 | Shibata et al. | |
| 4,848,503 A | 7/1989 | Yasui et al. | |
| 4,892,164 A | 1/1990 | Yasui et al. | |
| 4,907,552 A | * 3/1990 | Martin | 123/198 E |
| 4,953,525 A | 9/1990 | Sakurai et al. | |
| 5,016,725 A | 5/1991 | Muramatsu | |
| 5,072,698 A | * 12/1991 | Fujihira et al. | 123/198 E |
| 5,152,365 A | 10/1992 | Aoshima | |
| 5,172,786 A | 12/1992 | Ishibashi et al. | |
| 5,279,381 A | 1/1994 | Fukuda | |
| 5,490,573 A | 2/1996 | Hagiwara et al. | |
| 5,660,243 A | * 8/1997 | Anzalone et al. | 180/68.1 |
| 5,660,245 A | 8/1997 | Marier et al. | |
| 5,899,196 A | * 5/1999 | Chite | 123/198 E |
| 5,975,624 A | * 11/1999 | Rasidescu et al. | 180/311 |
| 6,016,943 A | * 1/2000 | Johnson et al. | 224/401 |
| 6,032,620 A | * 3/2000 | Tsukiana et al. | 123/198 E |
| 6,056,075 A | * 5/2000 | Kargilis | 180/68.1 |
| 6,167,976 B1 | * 1/2001 | O'Neill et al. | 180/69.2 |
| 6,302,228 B1 | * 10/2001 | Cottereau et al. | 180/68.1 |
| 6,454,040 B1 | * 9/2002 | Fukada | 180/374 |

OTHER PUBLICATIONS

Parts Catalogue, Model Year 1999, YFM35FXL, YFM35FXLC.
Parts Catalogue, Model Year 1999, YFM350FHL, YFM350FHLC.
Parts Catalogue, Model Year 1999, YFM250XL, YFM250XLC.
Parts Catalogue, Model Year 1999, YFB250FWL.
Parts Catalogue, Model Year 1999, YFA1L BREEZE.
Parts Catalogue, Model Year, 2000, YFB250FWM.
Parts Catalogue, Model Year, 2000, YFA1M, YFA1MC.
Parts Catalogue, Model Year, 2000, YFM250M, YFM250MC.
Parts Catalogue, Model Year, 2000, YFM350XM, YFM350XMC.
Parts Catalogue, Model Year, 2000, YFM80M, YFM80MC.
Parts Catalogue, Model Year, 2000, YFS200M.
Parts Catalogue, Model Year, 2000, YFZ350M.
Parts Catalogue, Model Year, 2000, YFM600HM, YFM600HMC.
Parts Catalogue, Model Year, 2000, YFM35FXM, YFM35FXMC.
Parts Catalogue, Model Year, 2000, YFM400FWNHM.
Parts Catalogue, Model Year, 2000, YFM400FAM, YFM400FAMC.
Parts Catalogue, Model Year, 2001, YFA1N, YFA1NC.
Parts Catalogue, Model Year, 2001, YFM400FAN, YFM400FAHN.
Parts Catalogue, Model Year, 2001, YFM400MWNN, YFM400FWNHN.
Parts Catalogue, Model Year, 2001, YFM660RN.
Parts Catalogue, Model Year, 2001, YFM80N, YFM80NC.
Parts Catalogue, Model Year, 2001, YFS200N.
Parts Catalogue, Model Year, 2001, YFZ350N.

* cited by examiner

AIR INLET FOR ATV

PRIORITY INFORMATION

This application is based on and claims priority to Japanese Patent Application No. 11-120,668, filed Apr. 27, 1999, and to Japanese Patent Application No. 11-120,567, filed Apr. 27, 1999, the entire contents of which are hereby expressly incorporated by reference.

BACKGROUND OF THE INVENTION

1. Field of the Invention

The present invention generally relates to air inlets for all terrain vehicles. More particularly, the present invention relates to protective layouts for air inlets used to supply cooling air to all terrain vehicle transmissions.

2. Related Art

All terrain vehicles, or offroad vehicles, are powered by internal combustion engines. As is known, the internal combustion engines include shafts that output rotary motion. The rotary motion is transferred from the engines to at least one motive member, such as a wheel. In some arrangements, the rotary motion is transferred to all wheels while, in other arrangements, the rotary motion is transferred to one or two wheels. The motion is commonly transferred through suitable transmissions.

In more recently introduced all terrain vehicles, the motion was transferred through transmissions that included continually variable speed transmissions. These continuously variable speed transmissions generally feature belts that extend around drive pulleys and driven pulleys. One of the pulleys, typically the drive pulley, includes a weight arrangement that axially moves one sheave of the pulley relative to the other sheave, thus altering the diameter at which the belt contacts the pulley. The other of the pulleys usually is spring biased to open and close (i.e., one sheave moves axially relative to the other sheave) in response to the movement of the first pulley. Thus, the pulley ratio varies with the speed of pulley rotation.

Because of the nearly continuous movement of the belt and pulleys, large levels of friction heat are generated by the transmission. In addition, the location of the transmission relative to the engine results in increased temperatures around the transmission. Importantly, due to the nature of the continuously variable speed transmission, the transmission often is positioned within a protective casing that reduces the likelihood of water and heat interfering with the operation of the transmission. The protective casing, however, disadvantageously defines a volume of stagnant air that is rapidly heated in the enclosed environment.

Accordingly, air is transferred into and out of the protective casing through cooling air inlets and outlets. This arrangement has helped to reduce the temperature within the protective casing; however, this arrangement also positions openings into the protective casing that are disposed in a wetting zone. The wetting zone is a zone that often is impacted by water, mud, dirt, sand and dust, for instance, during off road operation of the vehicle.

In response, several arrangements of snorkel tubes have been proposed. The snorkel tubes elevate the air inlet out of the wetting zone. The snorkel tubes can terminate within an air inlet box, such as that used to supply air to the induction system. However, recent advances in engine technology have led to difficulty accommodating the snorkel tubes within the same region as the induction system air inlet box. For instance, many all terrain vehicles now employ liquid cooled engines and as the engine size increases, so does the size of the cooling equipment. The liquid cooled engines use a forwardly disposed radiator that is cooled by ram air or by air drawn into an engine compartment by a forwardly disposed fan. As free space decreases within the engine compartment due to increasing engine size, so does airflow across the radiator. Moreover, as will be appreciated, passing the snorkel tubes through this region and mating the snorkel tubes to the air inlet box of the induction system only complicates and further congests an already full engine compartment. Thus, the snorkel can further decrease the efficiency of radiator heat transfer.

SUMMARY OF THE INVENTION

Accordingly, a new configuration of an air inlet into the transmission is desired. The configuration preferably positions the inlet outside of the wetting zone and away from the air flow passage through the radiator. In addition, the air inlet should be protected within an enclosed space that includes a generally protected air source.

Thus, one aspect of the present invention involves an all terrain vehicle comprising a frame assembly. At least one front wheel is dirigibly connected to the frame assembly. A front fender assembly is disposed generally above the front wheel. An engine is supported by the frame assembly and is positioned generally rearward of the front wheel. A cooling fan is supported by the frame assembly and is positioned forward of the engine. The cooling fan has an outer radial sweep path with a longitudinal cylindrical volume being defined by the sweep path and a generally longitudinal axis. An air inlet duct extends from a location rearward of the cooling fan to a location proximate a lower portion of the engine and at least a portion of the air inlet duct passes through the volume.

Another aspect of the present invention involves an all terrain vehicle comprising a frame assembly with a seat that is supported by the frame assembly. A fuel tank is disposed forwardly of the seat and an engine is positioned generally below the fuel tank and the seat. A front fender assembly is positioned forwardly of the fuel tank and is supported by the frame assembly. An air inlet chamber is at least partially formed by a recess in the front fender assembly.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENTS OF THE INVENTION

Figure 1:
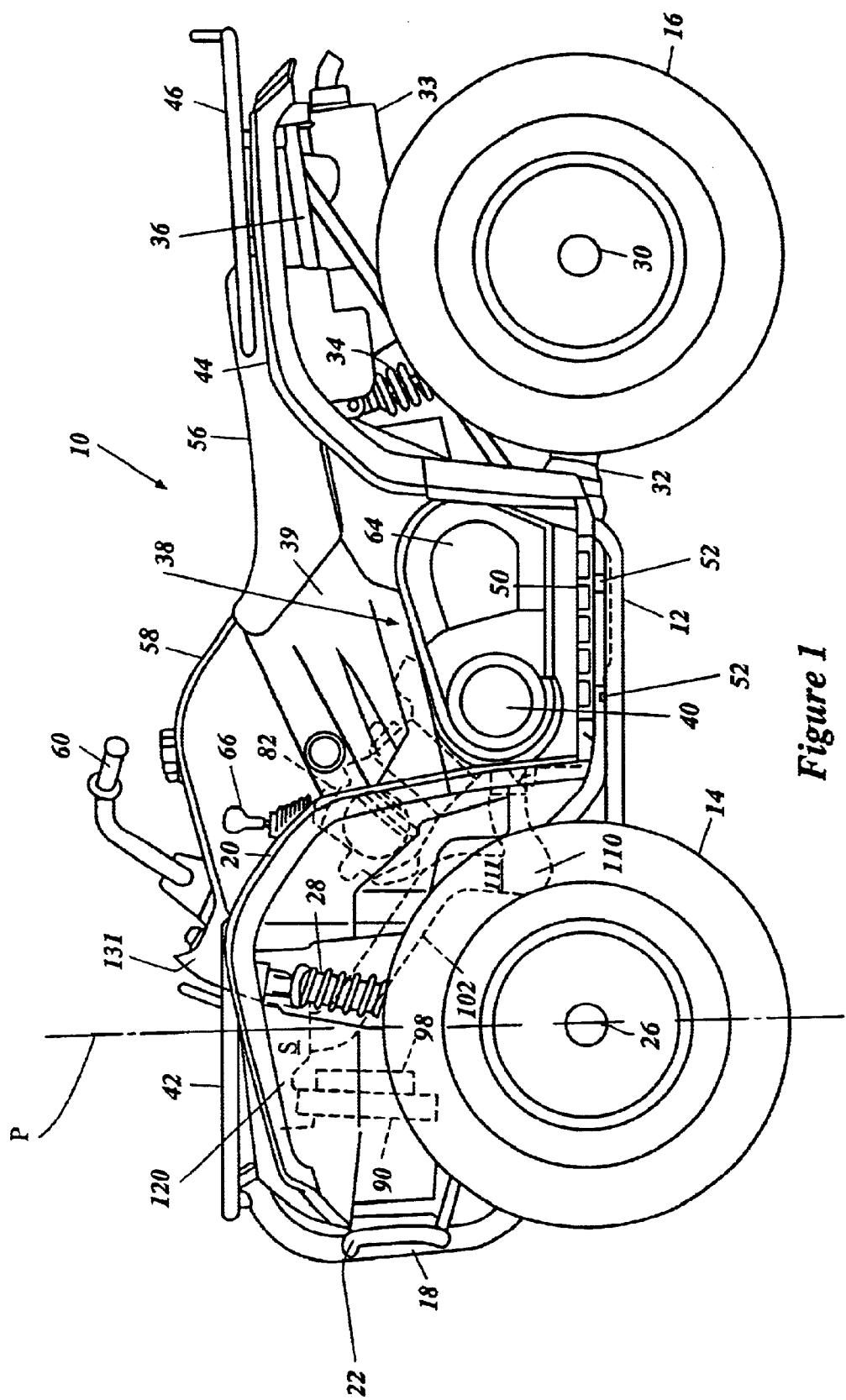
FIG. 1 is a side elevation view of an all terrain vehicle having an air intake configured and arranged in accordance with certain features, aspects and advantages of the present invention illustrated in hidden lines and having other internal components illustrated in hidden lines.

With reference now to FIG. 1, an offroad or all terrain vehicle, which is generally indicated by the reference numeral 10, is illustrated therein. The vehicle 10 preferably is arranged and configured in accordance with certain features, aspects and advantages of the present invention. More particularly, the vehicle 10 preferably comprises a transmission cooling air intake system, which will be described below, that is arranged and configured in accordance with certain features, aspects and advantages of the present invention. While the present invention will be described in the context of the illustrated vehicle 10, it should be understood that the present invention may also find utility in a number of other applications. For instance, although the illustrated vehicle 10 comprises four wheels, the present invention could be used on motor vehicles having two wheels, three wheels or more than four wheels. In addition, the present invention can also be used on vehicles having runners and tracks or other drive arrangements. Moreover, while the present air intake system will be described in the context of an air intake for a transmission cooling system, it is anticipated that the air intake system also can be modified to supply air to the induction system or to other components requiring cooling. Those of ordinary skill in the relevant arts will readily appreciate additional areas within the broad array of applications in which the present invention can be used.

With continued reference to FIG. 1, the illustrated vehicle 10 generally comprises a frame assembly 12 that is dirigibly supported by a plurality of wheels. In the illustrated arrangement, the frame assembly 12 is carried by a pair of front wheels 14 and a pair of rear wheels 16. As will be recognized, the vehicle 10 could be carried by a single forward wheel and a pair of rear wheels, a pair of forward wheels and single rear wheel, or any number of front or rear wheels. Furthermore, as discussed above, the present invention can also be used with vehicles that utilize driving track arrangements and forward runners for instance.

The frame assembly 12 is generally of the welded up type, such as that known to those of ordinary skill in the art. While not illustrated, the presently preferred type of frame comprises a left side assembly and right side assembly. The left side assembly and the right side assembly form generally parallelogram side structures that are interconnected with crossing members. Because these assemblies are well known to those of ordinary skill in the art, further description of the frame assembly 12 is deemed unnecessary to understand the present invention.

Figure 3:
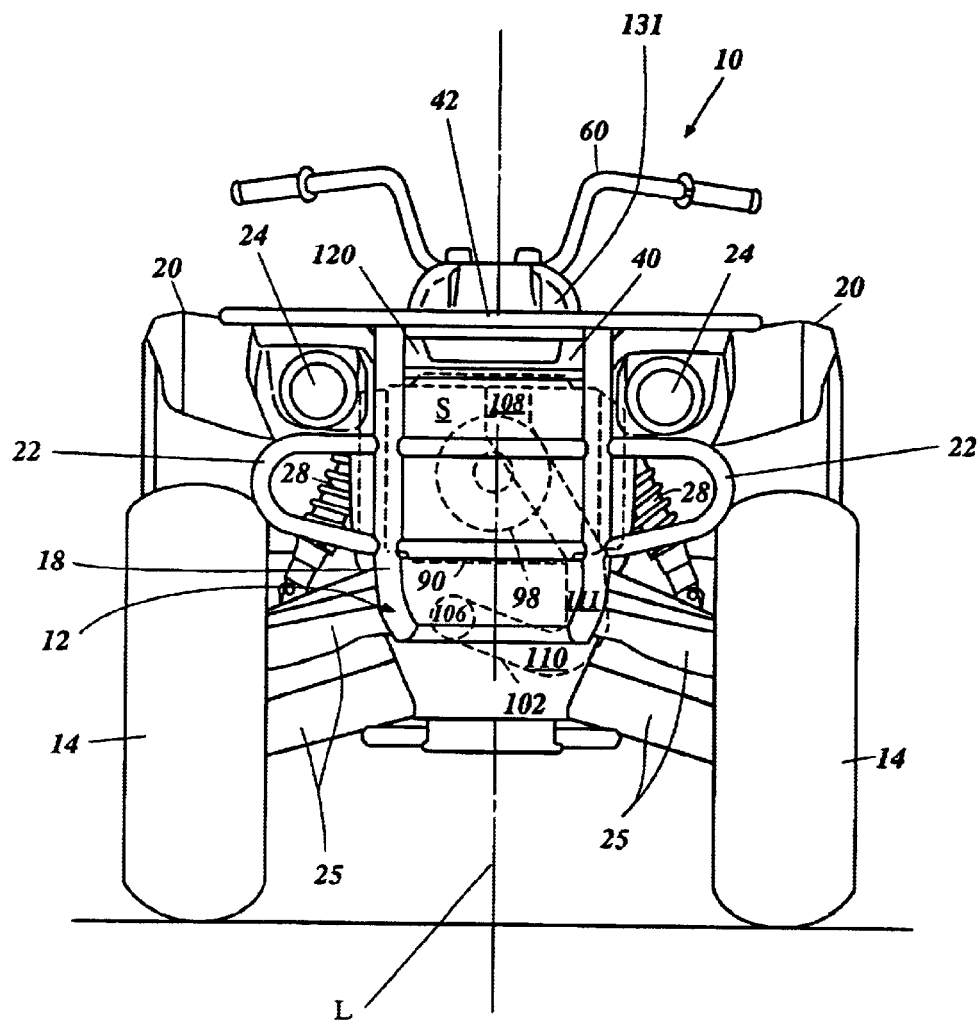
FIG. 3 is a front elevation view of the vehicle of FIG. 1 having an air intake illustrated in hidden lines.

A forward portion of the illustrated frame assembly 12 comprises a front bumper 18. With reference now to FIGS. 1 and 3, the front bumper 18 preferably extends upwardly and forwardly of a lower portion of the illustrated frame assembly 12. In this manner, the front bumper 18 wraps over a forward portion of a front fender assembly 20, which will be described below. The front bumper 18 can be formed integrally with the frame assembly 12 or can be a separate add-on component, as will be recognized by those of ordinary skill in the art.

Figure 2:
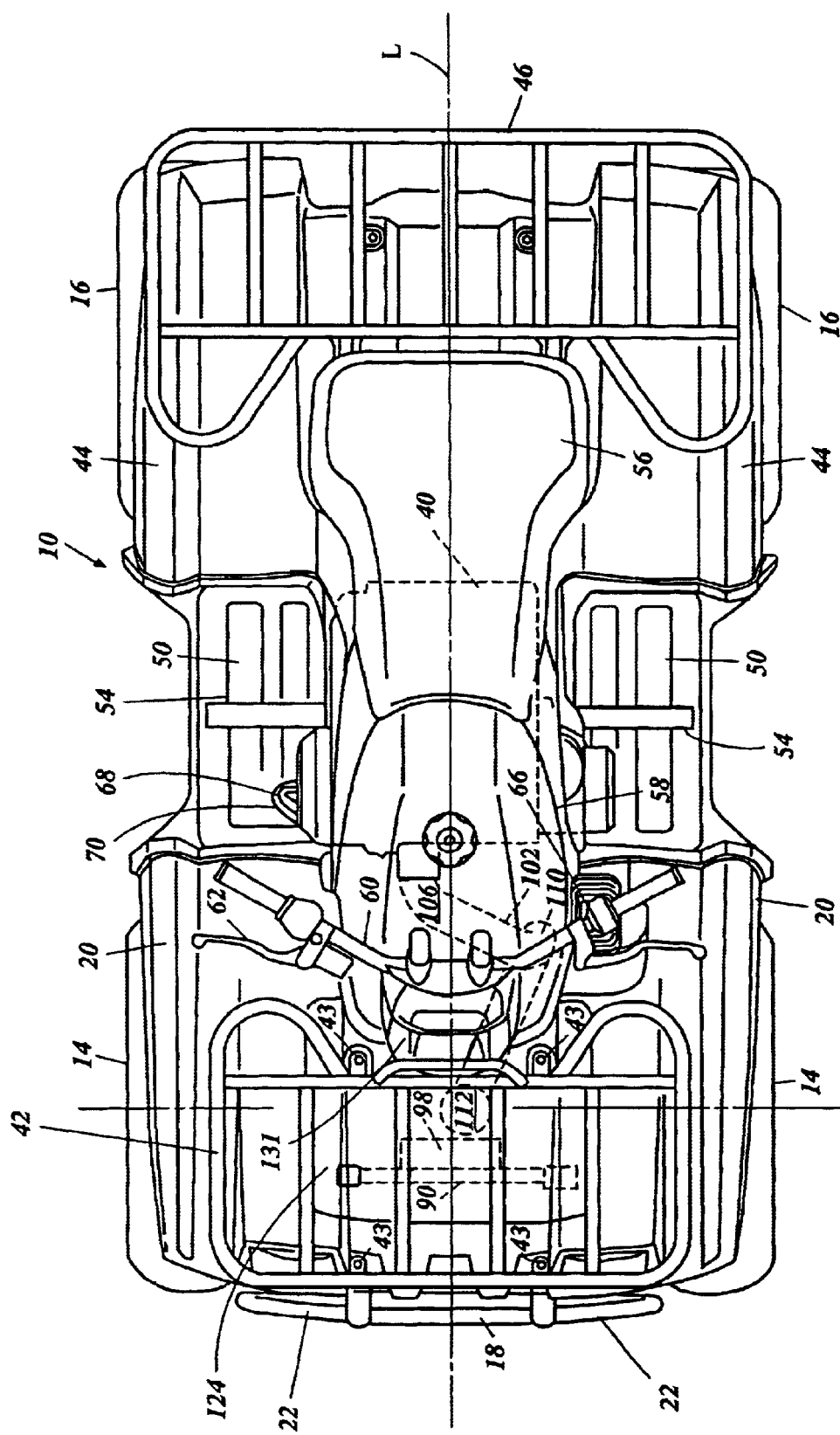
FIG. 2 is a top plan view of the vehicle of FIG. 1 having an air intake and an engine illustrated in hidden lines.
Figure 4:
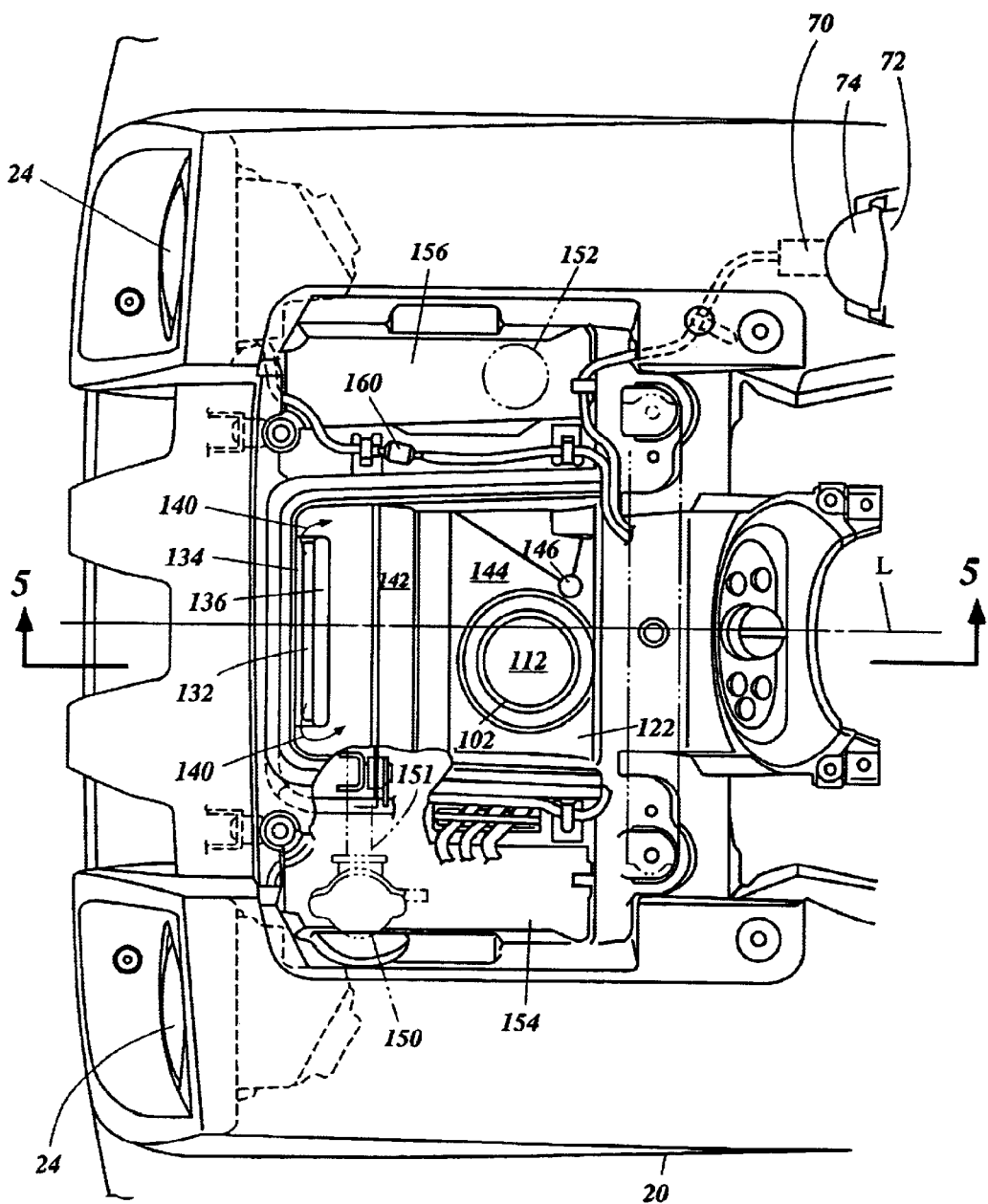
FIG. 4 is an enlarged partial top plan view of the vehicle of FIG. 1, illustrating a portion of a presently preferred air intake box and a relationship between a box, a radiator fill tube and a brake fluid fill tube.

Additionally, the front bumper 18 comprises a pair of headlight protectors 22 that extend laterally outward from the front bumper 18. The illustrated headlight protectors 22 wrap around and protect a pair of forwardly directed headlights 24, which are best shown in FIGS. 2 through 4.

The illustrated front wheels 14 are rotatably supported by a front suspension system. The illustrated front suspension system generally comprises a pair of A arms 25. The A arms 25 preferably extend laterally outward from the frame assembly 12 and support a carrier hub, which is not shown. Each front wheel 14 is supported by a front axle 26 that is journaled by the carrier hub (not shown). In addition, a shock absorber or strut 28 extends between a portion of the frame assembly 12 and the carrier hub to control vertical movement of the axle 26 during operation of the vehicle 10. Each shock absorber 28 is mounted in a suitable manner at an upper portion to the frame assembly 12 and at a lower portion to either the A arm 25 or the carrier hub. Preferably, the shock absorber 28 is positioned rearward of the axles 26 and is slightly inclined rearward. Such a positioning and disposition results in a more compact construction for the overall vehicle and better accommodates various components within an engine compartment, as will be described. Because the suspension arrangement generally is well known to those of ordinary skill in the art, further description of the arrangement is deemed unnecessary.

With continued reference to FIG. 1, the rear wheel 16 preferably also rotates about an axle 30. In the illustrated arrangement, both of the rear wheels 16 are mounted to a common axle 30; however, independently suspended rear wheels 16 also can be used. The illustrated axle 30 is rotatably supported by a rear swing arm 32, which extends from a portion of the frame assembly 12. Movement of the rear arm 32, and therefore the axle 30, is controlled using a shock absorber 34. The swing arm 32 preferably is pivotally attached to the frame assembly 12 and rotates about a generally horizontal axis. The shock absorber 34 can be connected to the swing arm 32 or to a gear box that is attached to a portion of the swing arm 32 proximate the axle 30. In addition, an upper portion of the shock absorber 34 preferably is connected to a portion of the frame assembly 12 such as a seat rail 36. In this manner, movement of the rear wheels 16 about the pivot point defined by the swing arm 32 can be controlled. In addition, in the illustrated arrangement, a muffler 33 is connected to the frame assembly 12 directly rearward of the shock absorber 34.

The illustrated frame assembly 12 forms a platform upon which a variety of other components are mounted. For instance, the hollow center of the illustrated frame assembly 12 generally defines an engine compartment 38. The engine compartment 38 generally is defined between the left portion and the right portion of the frame assembly 12 and generally is disposed between the front axle 26 and the rear axle 30. This location provides a low center of gravity for the vehicle by mounting a centrally located engine 40 within the engine compartment 38. The engine 40 can be of any suitable construction and can be positioned either transversely or longitudinally within the engine compartment 38. In other words, a crankshaft (not shown) of the engine 40 can extend transverse to the direction of travel of the vehicle 10 or can extend along the same direction of travel of the vehicle.

In some applications, such as the illustrated arrangement, a side panel 39 can at least partially enclose the engine compartment 38. The side panel 39 preferably extends downward from a portion of a seat 56 and a fuel tank 58 toward an exterior surface of the engine 40 and an associated transmission 64.

As indicated above, a forward fender assembly 20 preferably is disposed above the forward wheels 14. The forward fender assembly 20 can be comprised of a single component or multiple components and preferably extends around the front portion of the vehicle 10. The front fender assembly 20 desirably is made from a moldable resin material or a lightweight sheet metal and preferably is mounted to the frame assembly in any suitable manner. The illustrated arrangement uses threaded fasteners to removably attach the front fender assembly 20 to the frame assembly 12.

In the illustrated arrangement, a carrier rack 42 is mounted above a portion of the front fender assembly 20. With reference to FIG. 2, the carrier rack 42 preferably is connected to the front fender assembly 20 using mechanical fasteners 43, such as threaded fasteners, for instance. More preferably, the carrier rack 42 is connected to the front fender assembly 20 using threaded fasteners 43, or other mechanical fasteners, that can be removed from the top of the vehicle. The use of top mounted fasteners advantageously allows easy removal of the carrier rack 42 for maintenance. For instance, when operating the vehicle on a trail, should the carrier rack need to be removed to access a component that is positioned under the carrier rack 42, it is preferred that an operator not have to crawl underneath the vehicle to remove the carrier rack. Of course, the carrier rack 42 can be connected to the front bumper 18 and can be pivotally connected to the front bumper 18 is other applications. By pivotally mounting the carrier rack 42, the carrier rack 42 can be pivoted out of the way for maintenance without completely removing the rack 42 from the vehicle 10.

With reference again to FIG. 2, a rear fender assembly 44 is disposed above the rear wheels 16 on the illustrated vehicle 10. Similar to the front fender assembly 20, the rear fender assembly 44 desirably extends above both rear wheels 16 and preferably is formed as one or more than one components. In the illustrated arrangement, the rear fender assembly 44 is formed of a single component and carries a rear carrying rack 46. The rear fender assembly 44 can be manufactured from a variety of materials including molded resin composites and lightweight sheet metals. Desirably, the rear fender assembly 44 and the front fender assembly 20 protect the operator of the vehicle from debris kicked up by the tires during movement of the vehicle 10.

With reference now to FIG. 2, a pair of footsteps 50 extend laterally from a central portion of the illustrated vehicle 10. The footsteps 50 can be mounted to the frame assembly 12 in any suitable manner. Typically, the footsteps 50 are mounted using brackets 52, which extend outward from the frame assembly 12. Preferably, the footsteps 50 extend between a portion of the rear fender assembly 44 and a portion of the forward assembly 20 to create an enclosed and protected rider leg area. In addition, the footsteps 50 preferably include traction increasing surfaces, such as raised ridges 54 to increase foot traction for the operator of the vehicle 10. In some arrangements, the footsteps 50 (also called foot boards) comprise plate-like members. In other arrangements, the footsteps 50 are nerf bars. In yet other applications, the footsteps are tubular components upon which a rider can be supported.

A seat 56 preferably is disposed above a portion of the rear fender assembly 44. The seat 56 generally is configured to allow an operator to sit in straddle fashion with one leg on each footstep 50. Of course, the seat 56 can be configured to accommodate more than one rider in a tandem straddle fashion. The illustrated seat 56 is mounted to the seat rails 36 in any suitable manner, but preferably is mounted to the seat rails 36 in a locking and pivoting arrangement. More particularly, the seat 56 preferably includes a portion which is pivotably attached to the seat rails 36 such that the seat 56 can be unlatched and raised to access the engine compartment 38. In some arrangements, the seat can freely pivot and is not latched; however, latching better secures the seat 56 to the frame assembly.

With continued reference to FIGS. 1 and 2, a fuel tank 58 preferably is disposed forward of the illustrated seat 56. The fuel tank 58 is mounted in any suitable manner and can be made from any suitable material. Preferably, the fuel tank 58 is made from molded resin materials; however, the fuel tank 58 also can be formed from a lightweight metal material. The fuel tank 58 preferably is mounted rearward of a steering handle assembly 60.

The steering handle assembly 60 is coupled to the front wheels 14 through a suitable steering arrangement, which is not shown. The steering handle arrangement 60 also generally comprises a throttle actuator of some sort. In one arrangement, the throttle actuator is a twist grip. In other arrangements, the throttle actuator may be a thumb paddle or handpull lever. Moreover, a brake control lever 62 can be mounted to the handlebar assembly 60 for operation of the brakes.

The vehicle 10 preferably also includes a gear shifting arrangement. The gear shifting arrangement preferably is controlled by means of a gear shift lever 66. The gear shift lever 66 can be positioned anywhere proximate the operator of the vehicle 10 such that the gear shift lever 66 can be easily actuated by the operator. In some arrangements, the gear shift lever 66 operates a shifting mechanism for use when the vehicle is on the fly and in other arrangements the gear shift operator actuator 66 is used to control the gear shifting while the vehicle is at a standstill. In one arrangement, the gear shift actuator 66 is mounted within a recess formed within the forward fender assembly 20. An actuator relay assembly, which is not shown, generally transfers movement of the actuator 66 to a shift drum positioned within a transmission case 64 in the illustrated arrangement.

The illustrated vehicle 10 also comprises a foot brake actuator 68. The foot brake actuator 68 will be described in greater detail below. Generally speaking, the foot brake actuator 68 is pivotably attached to the frame assembly 12 through a suitable mounting bracket. When the foot brake actuator 68 is depressed by the foot of an operator, the brakes are applied in manner which acts to slow the vehicle to a stop. In some arrangements, the foot brake actuator 68 can operate a parking brake or can actuate all or fewer than all of the brakes associated with the wheels 14, 16. Preferably, the foot brake actuator 68 extends upwardly through a hole 70 defined within the footboard 50. In this arrangement, the majority of the foot brake actuator 68 is positioned out of the leg area of the vehicle 10.

With reference now to FIG. 4, an electrical outlet 70 can be positioned within the front fender assembly 20. The electrical outlet 70 preferably is disposed within a recess 72 formed within a portion of the front fender assembly 20. The electrical outlet 70 can be used to power electrical appliances through energy drawn from the battery and/or generator associated with the engine 40. The electrical outlet 70 preferably is positioned forward of a knee of the operator and proximate the mounting rack 42 upon which the electrical appliances being powered can be placed. In the illustrated arrangement, a hood 74 is disposed above a portion of the electrical outlet 70 to shield the electrical outlet 70 from splashing mud and water.

Figure 5:
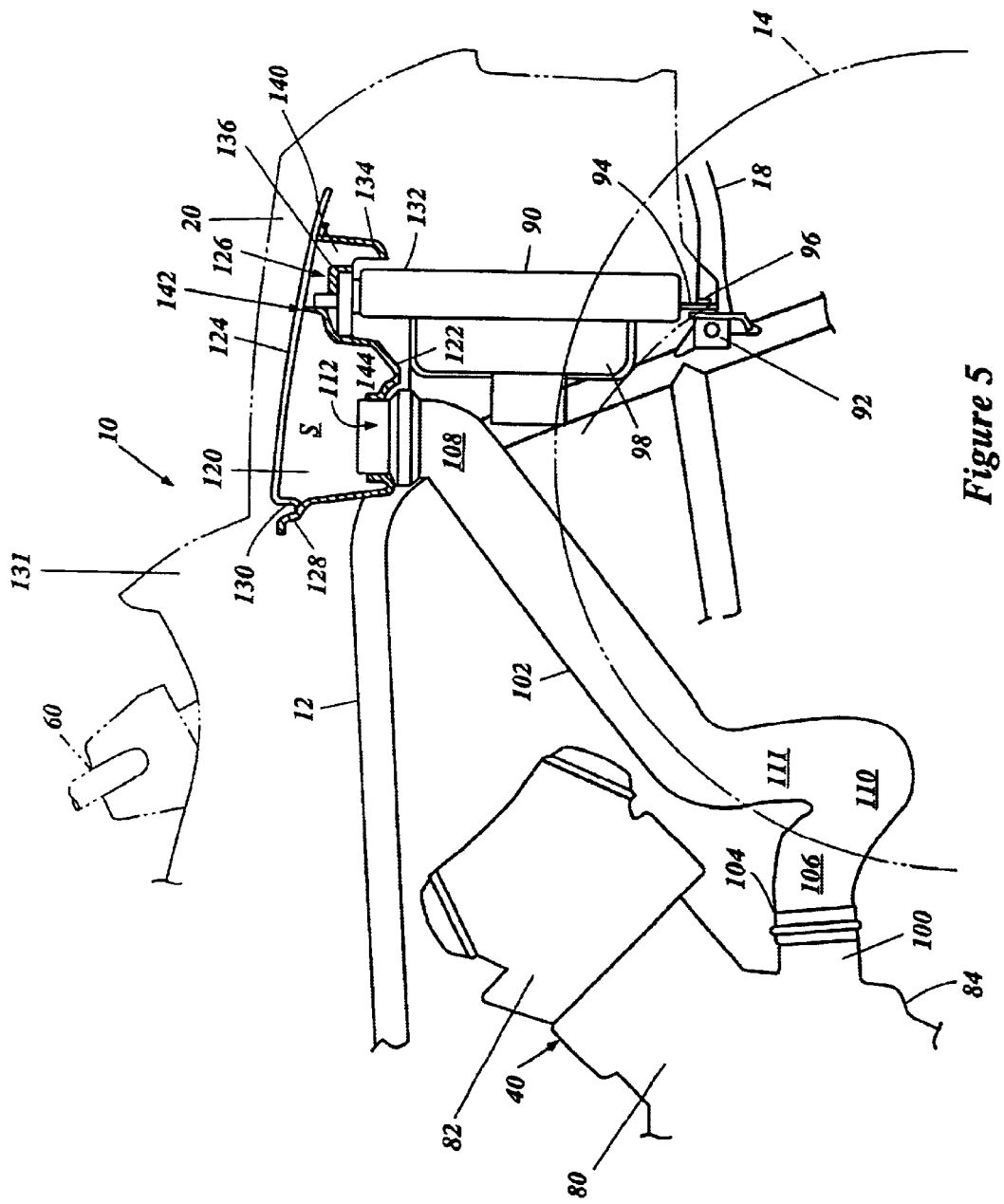
FIG. 5 is schematic partially sectioned side elevation view taken along the line 5—5 in FIG. 4, illustrating a presently preferred air intake box and ducting and a relationship between these components and a radiator.

With reference now to FIG. 5, the engine 40 and an associated transmission (not shown) will be described in slightly more detail. In general, the engine 40 comprises at least one cylinder body 80. A cylinder head 82 is disposed above the illustrated cylinder body 80 and is connected thereto in any suitable manner. A crankcase 84 is disposed below the illustrated cylinder body 80 and is connected thereto in any suitable manner. In the illustrated arrangement, the crankcase 84 preferably is integrally formed with a transmission case. More particularly, a crankshaft (not shown) rotates within the crankcase 84. The rotary motion of the crankshaft is transferred to an output shaft, or propeller shaft, through the transmission. The transmission preferably incorporates a belt drive which is disposed within the transmission case portion of the crankcase. Such constructions are well known to those of ordinary skill in the relevant arts.

The engine 40 preferably includes a plurality of cooling jackets (not shown) that extend through various components of the engine 40. For instance, cooling jackets can extend through the cylinder body 80 and the cylinder head 82. The cooling jackets preferably are connected to a radiator 90, or another type of heat exchanger, through suitable hoses. The hoses, the radiator and the cooling jackets preferably form a closed loop cooling system, such as that known in the automotive industry.

The radiator 90 preferably is mounted to the frame assembly 12 of the vehicle 10. In the illustrated arrangement, the front bumper 18 is mounted to the frame assembly using a mounting bracket 92. The mounting bracket 92 can be welded to a forward portion of the frame assembly 12. In addition, the mounting bracket 92 can be affixed to the frame assembly 12 in other suitable manners, such as through the use of threaded fasteners. The radiator 90 preferably comprises a mounting flange 94, which can be secured to the bracket 92 through the use of mechanical fasteners, such as a set of bolts 96.

With reference to FIG. 1, the radiator 90 preferably is disposed forward of a generally vertical transverse plane P that extends through a rotational axis defined by the front axles 26, when the front wheels 14 are positioned in a straight ahead arrangement. In addition, the radiator 90 preferably is centrally positioned between the front wheels 14. Such as positioning allows an increased surface area for the radiator while decreasing the likelihood of contact between the radiator 90 and the wheels 14. While the illustrated radiator 90 is generally vertical in orientation, it is anticipated that a variety of inclination angles can also be used to alter air flow across the radiator 90.

To augment the air flow created by movement of the vehicle, a fan 98 can be positioned proximate the radiator 90. In the illustrated arrangement, the fan 98 is integrally formed with a rear surface of the radiator 90. In some applications, the fan 98 can be spaced from the radiator 90. In addition, the fan 98 can be disposed forwardly or rearwardly of the radiator 90 depending upon the desired operating characteristics. In addition, in some application involving multiple radiator panels, the fan 98 can be interposed between panels or more than one fan can be used. With reference to FIGS. 2 and 3, the fan 98, which is somewhat smaller than the illustrated radiator 90, preferably is centrally disposed within the vehicle. Such a positioning of the fan 98 increases air flow and allows the use of a slightly reduced fan size. As will be appreciated, mounting the fan 98 to the radiator 90 reduces the complexity of the vehicle construction and results in more compactly arranged cooling system. Moreover, maintenance of the cooling system associated with the vehicle 10 is better facilitated.

With reference now to FIGS. 4 and 5, the air intake system which is arranged and configured in accordance with certain features, aspects and advantages of the present invention will be described. As introduced above, air is used to cool the belt drive portion of the transmission. Of course, air which is introduced through the air intake system also can be used for induction or for cooling other components. Because the air is used to cool the belt drive in the illustrated arrangement, a transmission air inlet 100 is formed in the transmission case 84. The transmission air inlet 100 can be formed along a portion of the transmission case 84 but preferably is positioned along a forward facing surface of the case 84. Air preferably is drawn into the transmission case 64 by rotating fan blades that are disposed within the case 64. Of course, other manners of pumping air into and out of the transmission case 64 also can be used. For instance, fans can be disposed in other regions of the cooling system, such as an inlet, outlet or air box.

A snorkel or inlet duct 102 is connected to the transmission air inlet 100. In the illustrated arrangement, a hose clamp 104 is used to secure a first end 106 of the duct 102 over the inlet 100. Of course, the duct 102 can be connected to the inlet 100 in any suitable manner. The duct 102 preferably extends upward to a second end 108, which desirably is positioned generally vertically higher than the first end 106 and generally vertically higher than the engine 40.

With reference to FIGS. 1 and 2, the first end 106 of the illustrated duct 102 extends slightly forward and transverse to a generally vertical longitudinal plane L that substantially bisects the vehicle into a right half and a left half. Preferably, the inlet 100 is disposed on one side of the plane L and the duct 102 extends across the plane L into a lowered trap portion 110. The trap portion 110 preferably is positioned lower than the inlet 100.

With continued reference to FIGS. 1 and 2, the duct 102 extends upward from the trap 110 and approaches the plane L and the plane P. In the illustrated arrangement, a substantially vertical portion 111 of the duct is positioned between the trap 110 and the second end 108. The duct 102 extends across the vehicle 10 and forward within the vehicle 10 from the trap 110. Preferably, the duct 102 does not extend across the plane L between the trap 110 and the second end 108. More preferably, however, the plane L intersects a small portion of the second end 108. In the illustrated arrangement, the plane L and the plane P intersect within a duct opening 112 defined at the second end 108 of the illustrated duct 102.

With this construction, the duct opening 112 advantageously is positioned within a space S that is defined rearward of the radiator 90 and generally vertically higher than an upper edge of the fan 98. In addition, as illustrated in FIG. 3, at least a portion of the illustrated duct 102 passes within a cylindrical volume area defined by a sweep of the fan (i.e., a cylindrical volume defined by the outer edge of the fan 98 extending along a generally longitudinal axis). Such a construction places the duct 102 within a protected zone. The zone is defined such that the front wheels, the suspension components and the steering components generally will not contact the duct 102 or the fan 98 in a damaging manner. Thus, the duct 102 is generally protected within the engine compartment 38.

With reference again to FIGS. 4 and 5, the duct opening 112 preferably is disposed within a protective air inlet chamber 120. The air inlet chamber 120 is generally defined by a box 122 with a generally removable lid 124. The illustrated two components 122, 124 cooperate to provide a substantially sealed environment into which air preferably is introduced passed a baffling arrangement 126. Preferably, the chamber 120 is centrally disposed within the width of the vehicle 10. More preferably, the chamber 120 is generally positioned rearward of the radiator 90 and the fan 98. In the illustrated arrangement, the chamber 120 is positioned within the space S. This configuration advantageously positions the chamber 120 substantially equidistantly between the two front wheels 14.

With reference now to FIG. 4, the box 122 preferably is integrally formed within the illustrated front fender assembly 20. As illustrated, the box 122 includes a variety of relief levels, which will be described. For instance, a step or groove 128 advantageously circumscribes at least a portion of the box 122. The groove 128 preferably completely circumscribes the entire box 122. With reference to FIG. 5, a tab 130 formed about a downwardly depending portion of the lid 124 preferably mates with the groove 128. The mating arrangement advantageously provides a sealed interconnection between the lid 124 and the box 122. Of course, other methods of connecting the two components 122, 124 can be used and other manners of sealing the connection can be used. In some applications, the connection may not be fully sealed because the infiltration of some water should not affect performance in those applications. It should be noted that in some applications, the lid 124 is integrally formed with a forward cowl 131 that covers a forward portion of the steering assembly (including the steering handle 60).

With continued reference to FIG. 5, a forward portion of the illustrated box 122 features a generally vertical opening 132. The opening 132 preferably is shielded on a forward side by a downwardly depending lip 134. The lip acts in concert with a baffle 136 to reduce the likelihood of mud and water being thrown into the compartment defined between the box 122 and the lid 124. Specifically, the lip 134 and the baffle 136 form a labyrinth air passage 140 into the chamber 120. In the illustrated arrangement, the air passage 140 is disposed forward of the radiator 90. In some applications, however, the air passage 140 can be disposed rearward or adjacent the radiator 90. As illustrated in FIG. 4, the air preferably flows up through the opening 132 after passing the lip 134, around the baffle 136 and into the chamber 120. This circuitous flow path greatly reduces the introduction of water and mud into the chamber 120 through the opening 132. Of course, filters and the like also can be used to reduce the ingress of dirt, dust and other debris.

The illustrated box 122 also comprises a shallow portion 142. The bottom of the box 122 then slopes to a trough region 144 generally rearward of the shallow portion 142. The trough region 144 preferably encircles the open end 112 of the duct 102. More preferably, the open end 112 of the duct 102 is disposed substantially vertically above the trough region 144 that encircles the duct 102. This configuration results in a well about the duct 102 that traps liquids rather than introducing the liquids directly into the duct 102. Preferably, even the trough region 144 generally is vertically higher than an upper portion of the fan 98. Thus, the configuration of the box 122 advantageously results in a compact arrangement that accommodates the moving components of the cooling system.

Furthermore, in the illustrated box 122, the lowest portion of the trough region 144 advantageously includes a small drain hole 146. In some configurations, the drain hole 146 is simply a hole through which liquids can freely pass. In other configuration, the drain hole 146 is connected to a fitting and a hose is connected to the fitting. The hose is disposed to draw liquids out of the chamber 120 during movement of the vehicle 10. Preferably, the hose is disposed to reduce the ingress of fluid through the hole 146 during operation of the vehicle 10 in deep water.

With reference again to FIG. 4, preferably a fill cap 150 that selective covers a fill tube 151 for the radiator 90 and a fill cap 152 for a brake fluid reservoir (not shown) are disposed within a pair of openings 154, 156. The chamber 120 (and the box 122) preferably is interposed between these openings 154, 156. The openings 154, 156 are covered by the lid 124 in the illustrated arrangement; however, it is anticipated that the openings 154, 156 can be closed by separate covers in some arrangements. In other applications, the openings 154, 156 may not be closed at all. In these applications, the fill caps 150, 152 can be directly accessed or the carrying rack 42 restricts access. The use of the lid 124, however, facilitates easy maintenance in the illustrated arrangement. The carrying rack 42 is removed or pivoted out of the way and the lid 124 is easily removed. Once the lid 124 is removed, the fill caps 150, 152 can be accessed for maintenance and the condition of the box 122 can be inspected. Thus, the illustrated arrangement facilitates quick maintenance and servicing of many components at once.

Moreover, in the illustrated arrangement, wires for the headlamps 24 and the electrical outlet 70 pass within the space between the lid 124 and the front fender assembly 20. As illustrated in FIG. 4, fuses 160 can be positioned within this space such that the fuses can be easily accessed and serviced while on the trail, for instance.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. In addition, while the illustrated box is formed as a recess in the front fender assembly, the box also can protrude from an upper surface of the front fender assembly. Moreover, not all of the features, aspects and advantages are necessarily required to practice the present invention. Accordingly, the scope of the present invention is intended to be defined only by the claims that follow.

What is claimed is:

1. An all terrain vehicle comprising a frame assembly, at least one front wheel being connected to said frame assembly, a front fender assembly being disposed generally above said front wheel, an inlet chamber being at least partially defined by a box that is integrally formed in said front fender assembly, an engine being supported by said frame assembly and being positioned generally rearward of said front wheel, a cooling fan being supported by said frame assembly and being positioned forward of said engine and below said front fender assembly, said cooling fan having an outer radial sweep path, a first longitudinal cylindrical volume being defined by said sweep path of said cooling fan and a generally longitudinal central axis of said cooling fan, an air inlet duct comprising an inlet and an outlet, said duct extending through a portion of said front fender assembly, said duct inlet opening to an upper side of said fender assembly at a location generally rearward of said cooling fan, said duct outlet opening proximate a lower portion of said engine, at least a portion of said air inlet duct passing through said volume at a location between said engine and said cooling fan.

2. The vehicle of claim 1, wherein said duct outlet is position along a generally longitudinal plane that substantially bisects said vehicle into a right half and a left half.

3. The vehicle of claim 2 further comprising a radiator, said cooling fan being position rearward of said radiator.

4. The vehicle of claim 3, wherein said radiator is connected to said frame assembly and said cooling fan is supported by said frame assembly through a connection to said radiator.

5. The vehicle of claim 4, wherein said cooling fan and said radiator form a single unit.

6. The vehicle of claim 3, wherein said duct inlet is disposed vertically higher than an uppermost portion of said cooling fan and rearward of said radiator.

7. The vehicle of claim 1 further comprising a shock absorber being connected to said frame assembly, said cooling fan being disposed forward of said shock absorber.

8. The vehicle of claim 7, wherein said duct inlet is disposed forward of said shock absorber.

9. The vehicle of claim 1, wherein said duct inlet is disposed within said box.

10. The vehicle of claim 1, wherein said inlet chamber is also at least partially defined by a lid.

11. The vehicle of claim 10, wherein said lid is removably attached to said box.

12. The vehicle of claim 11 further comprising a seal disposed between said lid and said box.

13. The vehicle of claim 10, wherein an air passage into said inlet chamber extends through a lower surface of said box.

14. The vehicle of claim 13, wherein said inlet chamber comprises at least one baffle.

15. The vehicle of claim 14, wherein said air passage comprises a labyrinth portion.

16. The vehicle of claim 1, wherein said box has a lowermost surface and said lowermost surface is disposed vertically higher than said volume.

17. The vehicle of claim 16, wherein said frame assembly has a width and said box is centrally positioned within said width.

18. The vehicle of claim 1 further comprising a radiator fill tube and a brake fluid fill tube that extend upward through a portion of said front fender assembly.

19. The vehicle of claim 18, wherein said radiator fill tube and said brake fluid fill tube are selectively covered by a lid and said lid partially defines said inlet chamber.

20. The vehicle of claim 19 further comprising a carrier rack being selectively disposed above said inlet chamber.

21. The vehicle of claim 20, wherein said carrier rack is removably connected to vehicle using mechanical fasteners.

22. The vehicle of claimed 21, wherein said mechanical fasteners can be tightened or loosened from above said front fender assembly.

23. An all terrain vehicle comprising a frame assembly, at least two wheels supporting said frame assembly, a seat being supported by said frame assembly, a fuel tank being disposed forwardly of said seat, a steering assembly being connected to at least one of said wheels and comprising a control disposed forward of at least a portion of said seat, an engine being positioned generally below said fuel tank and said seat, a front fender assembly being positioned forwardly of said fuel tank and being supported by said frame assembly, an air inlet chamber being at least partially formed by a recess in said front fender assembly, a removable lid that cooperates with said recess in said front fender assembly to form said chamber, and a duct that extends from said chamber toward said engine.

24. The vehicle of claim 23, wherein said duct comprises an inlet portion, an outlet portion and a trap portion and said inlet portion extends into said chamber.

25. The vehicle of claim 24, wherein said duct comprises a substantially vertical portion which is interposed between said inlet portion and said trap portion.

26. The vehicle of claim 25 further comprising a generally vertical longitudinal plane that substantially bisects said vehicle wherein said outlet portion is on a first side of said plane and said trap portion is one a second side of said plane.

27. The vehicle of claim 24 further comprising a generally vertical longitudinal plane that substantially bisects said vehicle wherein said inlet portion is on a first side of said plane and said outlet portion is on a second side of said plane.

28. An all terrain vehicle comprising a frame assembly, a pair of front wheels steerably connected to the frame assembly, a front fender assembly disposed above the front wheels and rigidly fixed to the frame assembly such that steering movement of the front wheels is not transferred to the front fender assembly, a radiator mounted below the front fender assembly and generally between the pair of front wheels, an engine mounted to the frame assembly at a location rearward of the front wheels, a continuously variable transmission connected to the engine, an air inlet box being defined in part by an upper surface of a portion of the front fender assembly and an air inlet duct extending from the air inlet box to at least one of the engine and the transmission, said air inlet duct comprising a trap portion and said trap portion being closer to said engine than said air inlet box.

29. The vehicle of claim 28 further comprising a generally vertical transverse plane extending through an center of rotation of the front wheels when positioned for straight ahead movement and said radiator being mounted forward of said transverse plane.

30. The vehicle of claim 29 further comprising a generally vertical longitudinal plane that generally bisects said frame assembly and said air inlet duct connecting with said air inlet box along said longitudinal plane.

31. The vehicle of claim 30, wherein said air inlet duct connects with said air inlet box along said transverse plane as well.

32. The vehicle of claim 30, wherein said air inlet duct crosses over said longitudinal plane between an inlet and an outlet.

33. The vehicle of claim 28, wherein said air inlet duct extends to said transmission such that an outlet of said air inlet duct is connected to said transmission and a lowermost portion of said trap portion is vertically lower than a lowermost portion of said outlet.

34. The vehicle of claim 28, wherein an opening to said air inlet box is disposed forward of said radiator.

35. The vehicle of claim 34, wherein air passing through said opening must pass up and over at least a portion of said radiator prior to entering said air inlet duct.

36. The vehicle of claim 35, wherein a baffle forces air passing through said opening to travel in a transverse direction before entering said air inlet duct.

37. The vehicle of claim 28, wherein said air inlet box comprises a drain opening formed in a lowermost portion of the air inlet box.

38. An all terrain vehicle comprising a frame assembly, a pair of front wheels steerably connected to said frame assembly, a seat supported by said frame assembly, a front fender assembly extending over at least a portion of said front wheels and being fixed to said frame assembly, an engine being disposed generally below said seat, said engine driving a belt drive arrangement, said belt drive arrangement being disposed within a transmission chamber defined by a transmission case, an air duct formed separately of said frame assembly and comprising an inlet end and an outlet end, said outlet end communicating with said transmission chamber, an air chamber being defined within an integrally formed recessed portion of said front fender assembly, said air chamber being further defined by a cover member that can be removably attached to said front fender assembly, said inlet end of said air duct opening into said air chamber, a radiator, defining a radiator chamber, a fill tube extending through said front fender assembly and communicating with said radiator, said fill tube being disposed within a region of said front fender assembly that is positioned below said cover member.

39. The vehicle of claim 38 further comprising a radiator and a cooling fan, said radiator and said cooling fan being positioned forward of said engine, said recess being positioned generally centrally in a lateral dimension of said vehicle, a bottom surface of said recess being disposed vertically higher than an upper edge of said cooling fan.

40. The vehicle of claim 39 further comprising a carrier rack that is positioned over at least a portion of said front fender assembly, said carrier rack being attached to said vehicle with fasteners that are adapted for tightening from a location above said vehicle.

41. The vehicle of claim 39, wherein said air duct extends through a region defined by a longitude projection of said cooling fan at a location between said cooling fan and said engine.

42. The vehicle of claim 41, wherein said outlet end of said air duct is positioned along a generally vertical plane that generally bisects said vehicle.

43. The vehicle of claim 39, wherein said outlet end of said air duct is positioned vertically higher than an uppermost portion of said cooling fan.

44. An all terrain vehicle comprising a frame assembly, a pair of front wheels steerably connected to the frame assembly, a front fender assembly disposed above the front wheels and rigidly fixed to the frame assembly such that steering movement of the front wheels is not transferred to the front fender assembly, a radiator mounted below the front fender assembly and generally between the pair of front wheels, an engine mounted to the frame assembly at a location rearward of the front wheels, a continuously variable transmission connected to the engine, an air inlet box being defined in part by an upper surface of a portion of the front fender assembly, an air inlet duct extending from the air inlet box to at least one of the engine and the transmission, an opening to said air inlet box is disposed forward of said radiator wherein air passing through said opening must pass up and over at least a portion of said radiator prior to entering said air inlet duct, and a baffle forcing air passing through said opening to travel in a transverse direction before entering said air inlet duct.

45. An all terrain vehicle comprising a frame assembly, a pair of front wheels steerably connected to the frame assembly, a front fender assembly disposed above the front wheels and rigidly fixed to the frame assembly such that steering movement of the front wheels is not transferred to the front fender assembly, a radiator mounted below the front fender assembly and generally between the pair of front wheels, an engine mounted to the frame assembly at a location rearward of the front wheels, a continuously variable transmission connected to the engine, an air inlet box being defined in part by an upper surface of a portion of the front fender assembly, said air inlet box comprising a drain opening formed in a lowermost portion of the air inlet box and an air inlet duct extending from the air inlet box to at least one of the engine and the transmission.

\* \* \* \* \*